United States Patent [19]

Langford

[11] 3,735,143

[45] May 22, 1973

[54] COLOR MONITORING APPARATUS

[75] Inventor: Graham G. Langford, Johannesburg, South Africa

[73] Assignee: Sortex Company of North America, Inc., Lowell, Mich.

[22] Filed: Jan. 3, 1972

[21] Appl. No.: 214,979

[52] U.S. Cl. .................. 250/226, 356/179, 250/233
[51] Int. Cl. .............................................. G01j 3/34
[58] Field of Search .................... 250/226, 237, 233, 250/207, 206; 356/173, 176, 177, 178, 179

[56] References Cited

UNITED STATES PATENTS

| | | | |
|---|---|---|---|
| 3,237,509 | 3/1966 | Fielding | 356/179 |
| 3,120,782 | 2/1964 | Goddard et al. | 250/226 X |
| 3,133,201 | 5/1964 | Rock | 356/177 |
| 3,354,319 | 11/1967 | Loewen et al. | 250/237 X |
| 3,020,793 | 2/1962 | Nebrech et al. | 250/226 X |

*Primary Examiner*—Walter Stolwein
*Attorney*—John E. McGarry

[57] ABSTRACT

A color monitoring apparatus in which the color of the product is photoelectrically monitored by viewing the product in its entirety and also serially viewing optical reference means having lighter and darker optical values than the product. An automatic gain control sets the gain from the photoelectric detecting means at a predetermined level based on the optical values of the optical reference means. The optical values seen by the detecting means can be changed by adjusting the optical reference means. A special shutter disk having radially and circumferentially spaced openings rotates beneath a photomultiplier tube to effect the serial viewing of the reference plates and the product.

12 Claims, 5 Drawing Figures

COLOR MONITORING APPARATUS

BACKGROUND OF THE INVENTION

1. Field of the Invention

This invention relates to color monitoring of materials such as food products. In one of its aspects, the invention relates to color monitoring of materials wherein a photoelectric sensing device serially and optically averages a first optical reference means, the product, and a second optical reference means. In another of its aspects, the invention relates to a color monitoring apparatus in which a photoelectric sensing device serially and optically averages an adjustable optical reference means and a product and the output of the photoelectric means is set by the signal from the adjustable optical reference means. In still another of its aspects, the invention relates to a shutter for photoelectric sequential optical averaging of optical reference means and product to be monitored.

2. State of the Prior Art

Food products such as roasted coffee beans, sugar, cookies, and other cooked products must be monitored to control the baking or cooking processes which are carried out on the food products. One method of monitoring the food products is to detect the color of the food products and compare that color to a predetermined sample. The color changes to be detected are small and the tests, therefore, must be highly accurate. For this purpose, samples of the cooked products have been taken and placed into a machine where they are checked for color. In addition to being slow and inefficient, this batch type of process does not provide a continuous read out of all products and does not lend itself to feedback control methods.

Recently, a monitoring apparatus has been devised for continuously monitoring the food products on a conveyor as they are moved from the cooking or baking apparatus. This monitoring apparatus is positioned above the conveyor on which the product moves and has a photoelectric sensing means which scans across the product, the output of the photomultiplier tube representing the color or light intensity of the product. The scanning apparatus also scans across a light optical reference plate on one side of the product and, in some cases, a dark optical reference means on the other side of the product to set an automatic gain control to maintain the output of the amplifier constant. Alternatively, the photomultiplier tube scans across a light reference on one side of the product and then reverts to an internal totally black reference. In this scanning operation, the scan across the product picks up holes between the products as in the case of products like french fries and potato chips, and blemishes in the product, resulting in an output from the photoelectric tube which varies greatly in amplitude and does not accurately reflect the average color of the product. Further, the system incurred optical averaging between portions of the scan, the averaging resulting in a complex waveform which was not easily understood and difficult to read on an ocilloscope.

It is therefore necessary to detect the average color of the entire viewing area of the product rather than the colors of individual segments of the product viewing area. Further, the monitoring apparatus must be capable of detecting overall color changes which may not be detectable by the human eye.

Further in this monitoring apparatus, the sensitivity of the apparatus is determined by the light optical reference and the dark reference or internal black signal. The light optical reference and the dark optical reference are therefore selected to meet the color and sensitivity required for each particular food product and the process which is being monitored. Frequently, the process or the products may be changed somewhat so that the standard color of the product changes. In order to anticipate these minor variations, the optical reference values must be selected with sufficiently wide latitude to permit these variations without substantial changes to the apparatus. The wide latitude of reference values results in some sacrifice in the sensitivity in the apparatus. Accordingly, a monitoring apparatus of this type should be adaptable to change the reference levels of the apparatus in order to maintain the sensitivity of the apparatus for different or slightly differing products.

Further, in monitoring food products, some products and processes produce relatively wide variations in color. Other products require very close tolerances of color. In some instances, the color must be controlled quite closely requiring greater sensitivity than in other cases where the color of the product varies over a wider range. The monitoring apparatus must also be readily adaptable to change the sensitivity in accordance with the product which is monitored.

BRIEF STATEMENT OF THE INVENTION

According to the invention, a color monitoring apparatus for food products and the like has a means for detecting the average color of the product in an optical viewing area. Light and dark optical reference means are also viewed sequentially with the product by the detecting means so that the output from the detecting means has a signal representative of each of the optical references and the color of the product. The optical reference signals are employed by an automatic gain control to stabilize the output of the detecting means at the predetermined value. At least one of the optical reference means, and preferably both of the optical reference means, are adjustable so that the sensitivity of the monitoring apparatus can be adjusted, and so that the general monitoring level can easily be changed to monitor products of different color or different color tolerances.

A shutter disk having radially and angularly spaced viewing windows is interposed between the light detecting means and the product and the optical reference means. This disk is rotated so that the light optical reference means, the product, and the dark optical reference means are serially exposed for detection by the light sensing means. The shutter thus permits complete exposure of each of the optical reference means as well as the product for averaging the color or light intensity of each of the areas viewed. By averaging the color of the product, the apparatus becomes insensitive to voids between the products and blemishes in the products. Yet the averaging makes the apparatus highly sensitive to minor overall color changes in the products which changes may result in changes in cooking processes and the like. Further, the averaging of the optical references permits the references to be easily adjusted to change the sensitivity or general sensing level of the apparatus.

BRIEF DESCRIPTION OF THE DRAWINGS

The invention will now be described with reference to the accompanying drawings in which.

DETAILED DESCRIPTION OF THE PREFERRED EMBODIMENT

Figure 1:
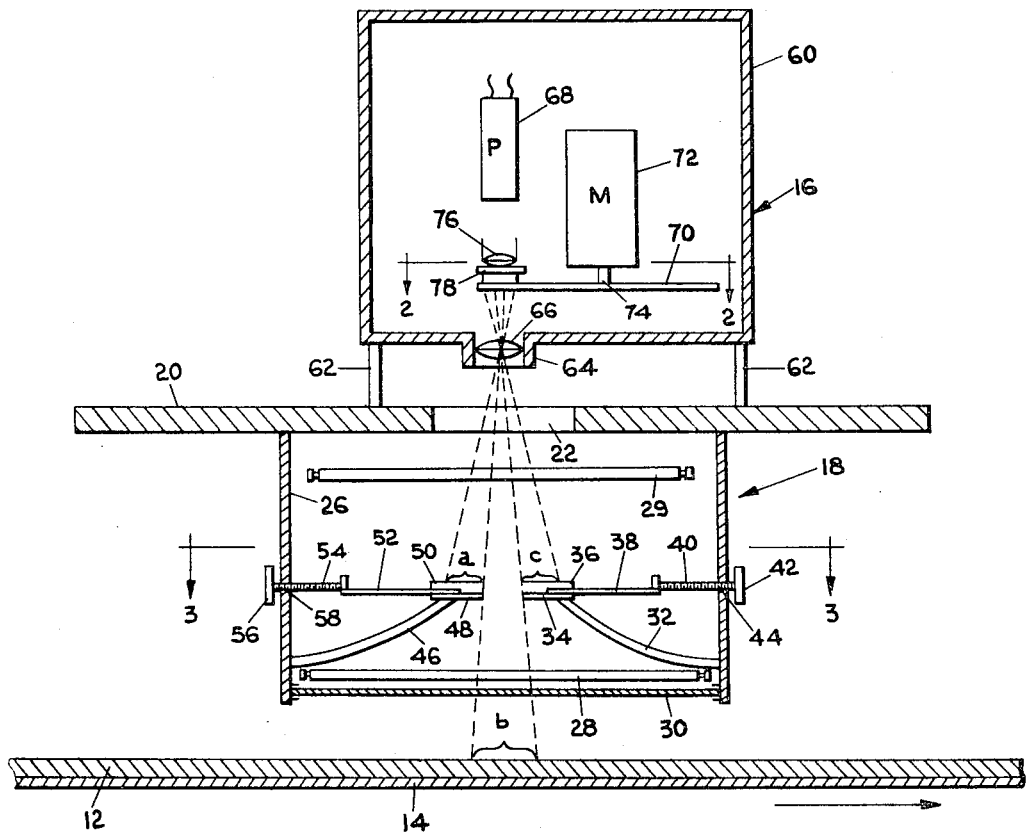
FIG. 1 is a schematic side elevational view in section illustrating a color monitoring system according to the invention.
Figure 3:
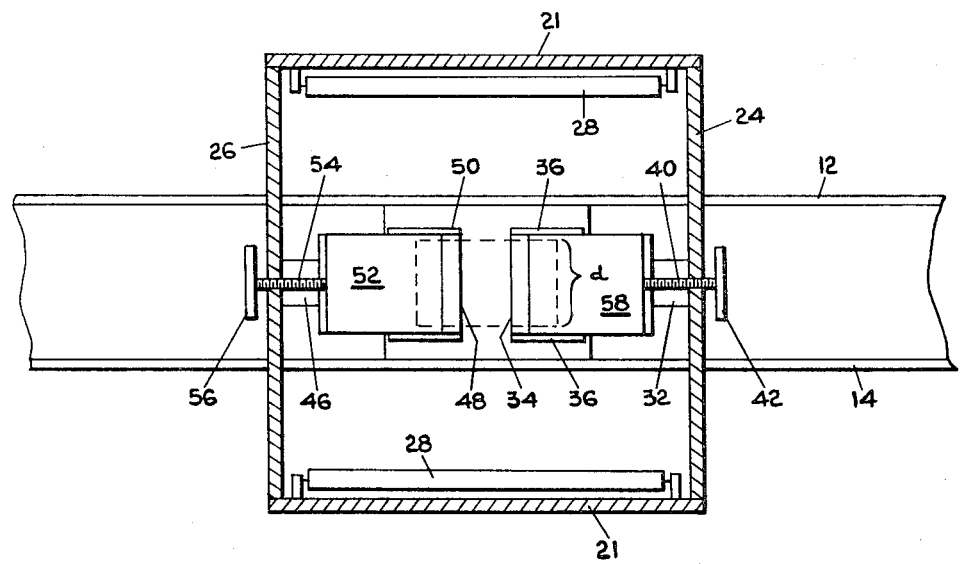
FIG. 3 is a partial sectional view seen along lines 3—3 of FIG. 1.
Figure 2:
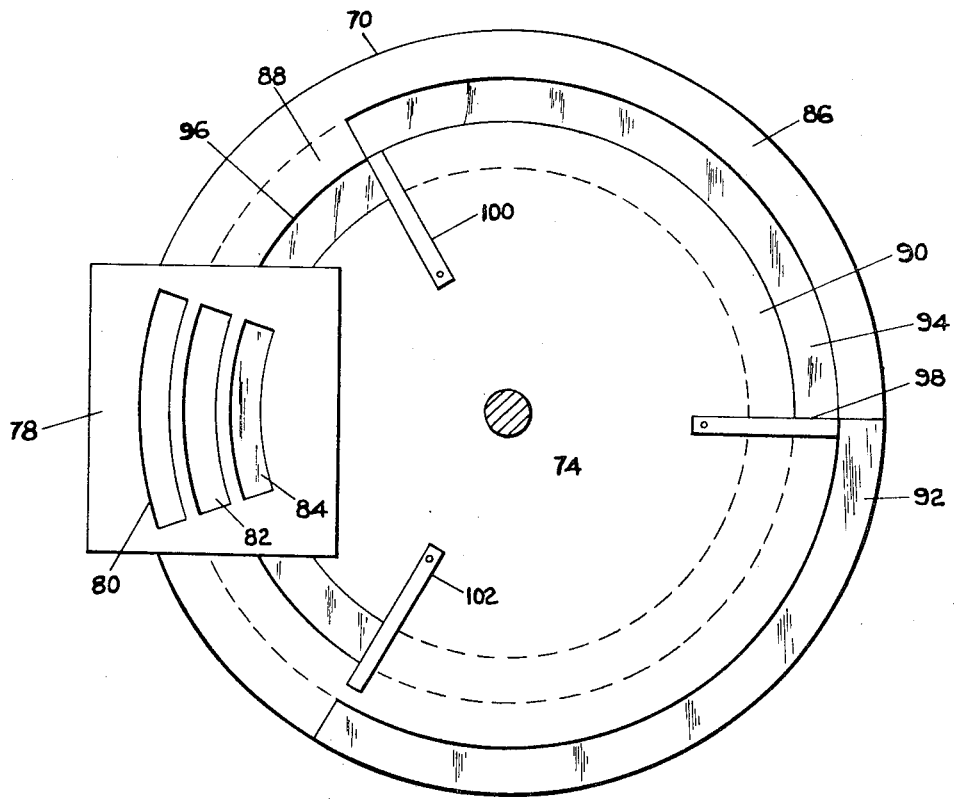
FIG. 2 is a partial sectional view along lines 2—2 of FIG. 1 illustrating the shutter disk.

Referring now to the drawings, and to FIGS. 1 through 3 in particular, there is illustrated a color monitoring device positioned above a product 12 on a conveyor belt 14. The product 12 can be any suitable product which, for example, has been subjected to a process, such as cooking, which alters the color. Such products include biscuits, cookies and other baked goods, roasted coffee, refined sugar, french fried potatoes, potato chips, and the like. The product 12 can be held on the conveyor belt by side walls at the sides of the conveyor. The color monitor comprises a color detecting unit 16 positioned on top of an illumination unit 18.

The illumination unit 18 is supported above the conveyor belt 14 through a horizontal plate 20 by means (not shown). The plate 20 has an opening 22 in a central portion thereof. Housing walls 21, 24, and 26 extend downwardly from the horizontal plate 20 and are secured thereto and to each other. Fluorescent tubes 28 are mounted between the housing walls 24 and 26 for illumination of the product 12. Alternately, incandescent lamps can be employed in lieu of fluorescent tubes. A pair of fluorescent tubes or incandescent lamps 29 are mounted at a top portion of the housing 20 for illumination of optical references and products. A clear glass plate 30 is suspended by suitable guides at the bottom of the housing walls 24 and 26.

A support arm 32 is fixed at its lower end to housing wall 24 and extends upwardly to a central portion of the housing 18 between walls 24 and 26. A base reference plate 34 having guides 36 is secured to the top portion of the support arm 32. A top reference plate 38 is slidably received on the base reference plate 34 between the guides 36 and is rotatably coupled to a threaded rod 40 at one end thereof. The threaded rod 40 threadably engages a threaded bore 44 in the housing wall 24. A knob 42 is provided on the center end of the rod 40 for ease in adjustment of the rod 40 and the consequent movement of top plate 38.

Similarly, on the other side of the housing, a support arm 46 is secured at a lower portion to the housing wall 26 and extends upwardly and inwardly to a central portion of the housing 20. A base reference plate 48 with upstanding guides 50 is secured to the top of the support arm 46. A top reference plate 52 is slidably received on the base reference plate 48 between the guides 50. A threaded rod 54 having a knob 56 at its outer end threadably engages a threaded aperture 58 in the support plate 26 and is journalled in an outer end portion of the top reference plate 52.

The base reference plates 34 and 48 are positioned in a central portion of the housing 20, leaving a small space between them for viewing of the product. Each of the base plates has a white or light colored upper surface. The top reference plates 38 and 52 have dark or black upper surfaces. Alternately, the top reference plates 38 and 52 can have light surfaces and the base reference plates 34 and 48 can have dark surfaces. Instead of the black and white combination, different shades of gray can also be employed. The black and white combination is preferred because of the wide range of adjustment provided by this combination. Movement of either of the top reference plates with respect to the base reference plates changes the amount of base reference plate which is exposed to the color detecting unit 16.

The color detecting unit 16 comprises a housing 60 which rests on supports 62 above the illumination housing 20. The housing 60 has a bottom opening 64 in a bottom wall thereof, and a lens 66 in the opening 64. Supported above the opening 64 for viewing through the lens 66 is a photomultiplier tube 68. The lens 66 inverts and reduces the images seen by the photomultiplier tube 68. A shutter disk 70 is rotatably supported within the housing 60 on a shaft 74 by motor 72 which causes rotation of the disk 70. One portion of the disk 70 is interposed beneath the photomultiplier tube in the line of sight between the tube and the lens 66. A lens 76 and an aperture plate 78 is mounted between the photomultiplier tube 68 and the rotating disk 74. Suitable color filters (not shown) can also be mounted in front of the photomultiplier tube. As illustrated in FIG. 2, the aperture plate 78 has spaced arcuate openings 80, 82, and 84 which are respectively aligned with concentric rings 86, 88, and 90.

The shutter disk 70 has clear shutter openings 92, 94 and 96 positioned with concentric rings 86, 88 and 90, respectively. The shutter openings are angularly spaced about the circumference of the disk. Each of the shutter openings 92, 94 and 96 occupies approximately 120° of its respective ring. Desirably the shutter disk is made from clear plastic or glass and painted black over one surface and leaving the openings 92, 94, and 96 unpainted. Conceivably, the disk can be made from a metal plate with the shutter openings 92, 94, and 96 removed from the disk. A crossover correction plate 98 is positioned at the trailing edge of the shutter opening 94. A second crossover correction plate 100 is positioned at the trailing edge of the shutter opening 96. A third crossover correction plate 102 is positioned at the leading edge of the shutter opening 96. The correction plates are adjustably secured to the disk 70 such as by a screw at the inner portion thereof or by a pressure sensitive adhesive.

The motor 72 rotates the shutter disk 70 beneath the aperture plate 78 in a counterclockwise direction as viewed in FIG. 2. During rotation, the shutter openings 96, 94, and 92 will be serially exposed through the openings 84, 82 and 80 respectively. The crossover correction plates 98, 100 and 102 block a portion of the light passing through the shutter openings during a transitional period when more than one shutter opening is exposed through the arcuate openings in the aperture plate 78.

The operation of the apparatus illustrated in FIGS. 1 through 3 is as follows: The product 12 is moved by the conveyor belt in the direction of the arrow from left to right as viewed in FIGS. 1 and 2. The photomultiplier tube 68 views the product through the lens 76, aperture plate 78, shutter disk 70, lens 66 and glass plate 30. The shutter disk 70 is continuously rotated in a counter-clockwise direction as viewed in FIG. 2 beneath the photomultiplier tube. Alternately, the shutter disk 70 can be rotated in a clockwise direction if desirable and the reference plate values will be reversed to give same sequence of photomultiplier tube output. The position of the shutter disk 70 is such that the photomultiplier tube views only the reference plates 48 and 52 when the shutter opening 96 is beneath the opening 84. The photomultiplier tube 68 views only the product 12 when the shutter opening 94 is beneath the opening 82. And the photomultiplier tube 68 views only the reference plates 34 and 38 when the shutter opening 92 is beneath the opening 80. The phantom lines in FIGS. 1 and 3 illustrates the projection of the images for viewing by the photomultiplier tube 68.

As the shutter disk 70 rotates, the shutter opening 96 will appear beneath the opening 84 in the aperture plate 78. During this period of time, the photomultiplier tube will view only through the opening 84 and the shutter opening 96. Accordingly, the photomultiplier tube will view the area illustrated by "a" illustrated in FIG. 1. The width of the view "d" is illustrated in FIG. 3 by phantom lines. During this first period of time, the photomultiplier tube will thus view those portions of the base reference plate 48 and the top reference plate 52 exposed to the photomultiplier tube and falling within the area "a" and "d". The amount of light sensed by the photomultiplier tube will depend on the amount of the white base reference plate 48 which is exposed to the photomultiplier tube beneath the top reference plate 52. Because the entire area is viewed for a given period of time, the photomultiplier tube will average the light value for the entire viewed area. Although the photomultiplier tube will see portions of the base plate and the top plate 52, the intensity of light seen by the photomultiplier tube will result substantially from the base plate 48. Accordingly, the output for the photomultiplier tube during this first time period will be a function of the amount of the white base reference plate 48 which is exposed by the top reference plate 52.

As the shutter disk 70 continues to rotate in a counterclockwise direction, the shutter opening 94 will appear beneath the arcuate opening 82 of the aperture plate 78. There will be a short interval of time during which the trailing end of the shutter opening 96 will appear beneath the opening 84 and the leading edge of the shutter opening 94 will appear beneath the shutter opening 82. During this short period of time, a radical surge in light viewed by the photomultiplier tube may occur, thus resulting in a spike in the output signal from the photomultiplier tube. The crossover correction plate 100 masks a portion of the trailing end of the shutter opening 96, and/or a portion of the leading edge of the shutter opening 94 to eliminate the spike. The plate 100 is adjustable to ensure that the average of the two partially exposed arcuate apertures 96 and 94 does not excede the area of the following aperture 94 to avoid premature setting of the automatic gain control. The correction plate 100 can therefore be any solid strip of material which can be adjustably fixed to the rotating shutter disk 70 to block the light from passing through the shutter opening 96 or 94. For example, a strip of black tape or a metal plate can be used for this purpose. A low pass filter can be used in the amplifying circuit 104 (FIG. 4) in lieu of or in addition to the crossover plates to further mute the spikes.

As the shutter opening 94 is exposed beneath the aperture plate 82, the product 12 is viewed in area "b" illustrated in FIG. 1. The photomultiplier tube, during this period of time, produces an output signal which is representative of the color of the product 12. Various color filters can be used to sensitize the photomultiplier tube to a particular color of the product in a manner well known to those having ordinary skill in this art. Once again, the photomultiplier tube views the entire product area substantially simultaneously and for a given length of time. By this procedure, the photomultiplier tube 68 is able to generate an output signal representative of the average color of the product during this second viewing time.

As the shutter disk 70 continues to rotate, the shutter opening 94 passes from beneath the opening 82 and the shutter opening 92 passes beneath the opening 80 in the aperture plate 78. Again, during the transition period during which portions of the shutter openings 94 and 92 are exposed beneath the aperture openings 82 and 80 respectively, a spike may occur in the output signal from the photomultiplier tube 68. The adjustable correction plate 98 masks a portion of the trailing end of the shutter opening 94 and/or a portion of the leading end of the shutter openings 92 to eliminate this spike. During this third period of time, when the shutter opening 92 is exposed beneath the arcuate opening 80 in plate 17, the photomultiplier tube views only the area "c" illustrated in FIG. 1. During this period of time, the photomultiplier tube views the exposed portion of the base reference plate 34 and a portion of the top reference plate 38. The photomultiplier tube will average the light viewed within area "c" on these two plates and the resulting signal from the photomultiplier tube 68 will be a function of the amount of the exposed white surface of the base reference plate 34. Preferably, the base plate 48 is more exposed than the base plate 34. The result is that the photomultiplier tube first views a "light" reference, comprised of base plate 48 and top plate 52, then views the product, and then views a "dark" reference comprised of the exposed portion of the base plate 34 and a portion of the top plate 38. The photomultiplier tube 68 views each area sequentially in distinct intervals without scanning across each of the areas sequentially. The averaging of each area is thus done by the photomultiplier tube.

Frequently, the apparatus is used to monitor color of the product. For this purpose, color filters (not shown) are placed in front of the photomultiplier tube 68 so that the monitored color will appear light to the photomultiplier tube and other colors will appear dark to the photomultiplier tube. Alternately, the filters selected can filter out the monitored color so that the monitored color appears dark and other colors appear lighter. Such filtering techniques are well known to those skilled in the art of photoelectric monitoring.

Figure 4:
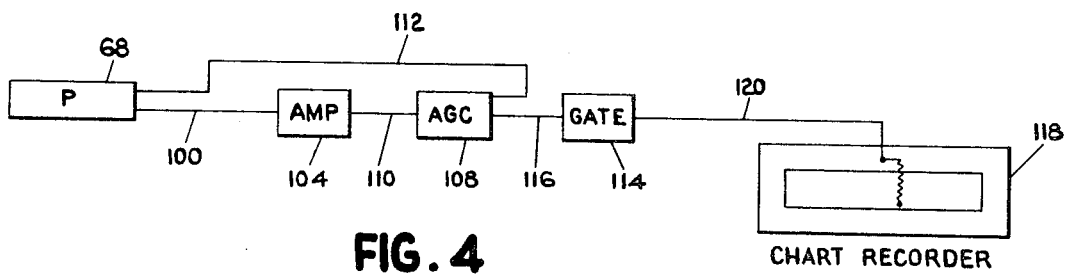
FIG. 4 is a schematic block diagram of the electrical system used in the color monitoring system.

Reference is now made to FIG. 4 for a description of the electrical apparatus used according to the invention. The output from the photomultiplier tube 68 is applied to an amplifier 104 through a lead 100. The output from the amplifier 104 is applied to an automatic gain control 108 through a lead 110. The automatic gain control 108 stabilizes the amplifier output by feedback to the photomultiplier tube at a predetermined voltage value based on pulsed inputs. The gain is stabilized between the dark and light outputs from the photomultiplier tube with the product level in between. The pulses representing the dark and the light references sensed by the photomultiplier tube set the gain for the photomultiplier tube and the signal representing the product color or lightness fluctuates between the dark and light reference values. Accordingly, changing of the dark and the light references, by moving either of the top reference plates 38 or 54 will thereby change the gain from the photomultiplier tube.

The output from the automatic gain control is fed back through feedback line 112 to the photomultiplier tube 68. The output of the automatic gain control 108 is further applied to a gating circuit 114 through a lead 116. The gating circuit 114 chops the reference pulses from the signal and applies the signal representative of the product color to a chart recorder 118 via lead 120. The range of the chart recorder is set by the automatic gain control which in turn is set by the values of the "light" and "dark" references. Therefore, adjustment of the reference plates 32 and 58 to expose more of both of the white base reference plates 34 and 48 will increase the upper and lower limits of light intensities on the chart recorder 118. Conversely, covering more of the base reference plates 34 and 48 will descrease the limits of light intensities at the extremities of the chart recorder. Exposing less of base reference plate 48 and more of base reference plate 34 will narrow the range of light values on the chart recorder, thereby making the monitoring device more sensitive. Exposing more of base reference plate 48 and less of base reference plate 34 will have the opposite result, namely to desensitize the monitoring device.

The automatic gain control can be any circuit for controlling automatically the gain of a photomultiplier tube which receives a pulsed light input, the pulses of which may vary in amplitude. An example of such a system is disclosed and claimed in the U.S. Pat. to Chapman, No. 3 439 172, which patent is incorporated here-in by reference. In the Chapman system, a Schmitt trigger is employed as a switch to trigger discharge of a capacitor. The trigger circuit may in some cases discharge the capacitor when the product is near one of the reference values. In order to prevent premature discharge of the capacitor during such operations, it is desirable to substitute for the Schmitt trigger a monostable circuit whose time period is greater than that occupied by the product in the wave cycle.

Figure 5:
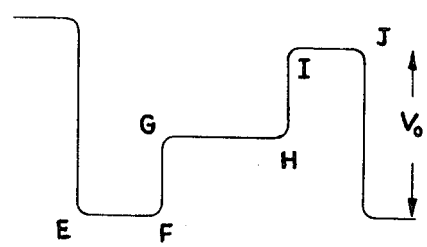
FIG. 5 is a representation of a wave form output from the automatic gain control.

The wave form from the automatic gain control 108 is illustrated in FIG. 5. The wave form has a first portion EF which represents the "light" reference (reference plates 48 and 52), a second portion GH which represents the color of the product, and a third portion IJ which represents the "dark" reference (reference plates 34 and 38). The automatic gain control controls the photomultiplier output so that the voltage level between EF and IH is always at a predetermined value voltage such as 6 volts, for example, regardless of the value of the light reference or the dark reference. Thus, adjustment of the light reference or dark reference, by adjusting plates 52 and/or plates 38, will not result in any relative changes between the portions EF and IJ of the signal, but will change the sensitivity of the portion GH within the range level between between the portions EF and IJ.

The invention thus provides a color monitoring device which is very versatile for monitoring products of different colors or light values and while maintaining any given degree of sensitivity. The reference plates can be adjusted so that the range of monitored light values is increased or decreased. Further, the reference plates can be adjusted to change the limits of the range of monitored light values to alter the sensitivity of the monitoring device so that the characteristics of the monitoring device can be readily adapted to the particular product being monitored.

The apparatus is suitable for many different products. For more coarse products, such as french fried potatoes, potato chips and the like, the detecting unit 16 can be raised for a larger viewing area. For finer products, such as sugar and roast coffee, it may be desirable to lower the detecting unit to view a smaller area.

With the invention, a coarse product, such as french fried potatoes, with deep voids between the individual food particles can be accurately monitored for color without adverse effects of the voids or any blemishes which may be present in the product. These voids and blemishes tend to be constant over a reasonable averaged area. The overall color is detected and small color changes can be accurately detected. The monitoring machine continuously detects both lighter and darker color changes and supplies this information in digital or analogue form which can be readily used to control process equipment.

As used herein color is intended to include white, black and greys as well as the normal components of the visual spectrum and those outside the visual spectrum, namely near ultra violet and infrared. The apparatus can operate to monitor strictly light intensity of value of the product without regard to spectral color.

Reasonable variation and modification are possible within the scope of the foregoing disclosure, the drawings and the appended claims without departing from the spirit of the invention.

The embodiments of the invention in which an exclusive property or privilege is claimed are defined as follows:

1. In a color monitoring apparatus having a monitoring station, means for conveying a product through said monitoring station; light sensing means at said monitoring station to sense the light intensity of said product passing through said monitoring station; first optical reference means fixed with respect to said light sensing means and positioned at a first location for viewing by said light sensing means and having a first area exposed to said light sensing means representative of a first optical value; second optical reference means fixed with respect to said light sensing means, and positioned at a second location for viewing by said light sensing means, said second optical reference means having a second area exposed to said light sensing means and representing a second optical value, the optical intensity of said product passing through said monitoring station being normally between said first and second optical reference values, the improvement which comprises:

shutter means interposed between said light sensing means and said product and between said light sensing means and said first and second optical reference means for sequentially exposing to said sensing means said first area of said first optical reference means, said product, and said second area of said second optical reference means, each of said viewing areas being exposed in its entirety substantially simultaneously so that the light intensity of each viewing area is averaged by said light sensing means;

whereby the output from said sensing means is a function of the average light values of said first optical reference means, said product, and said second optical reference means, and the amplitude of said output is a function of the difference between said first and second optical reference values.

2. A color monitoring apparatus according to claim 1 and further comprising means coupled to the output of said light sensing means to stabilize said amplitude of said output of said light sensing means at a predetermined reference voltage responsive to signals representative of said first and second optical values.

3. A color monitoring apparatus according to claim 2 and further comprising means for adjusting at least one of said first and second optical reference means to vary the optical reference values seen by said sensing means, whereby the sensitivity of said monitoring apparatus can be adjusted.

4. A color monitoring apparatus according to claim 3 wherein said adjustable optical reference means comprises a base member fixed with respect to said light sensing means and a cover member covering a portion of a surface of said base member, said surface portion being exposed to said light sensing means, said cover being slidable with respect to said base to alter the amount of said surface portion of said base member exposed to said sensing means, said base member exposed surface portion and said cover member being of different light values such that adjustment of said cover member with respect to said base member alters the intensity of light viewed by said light sensing means.

5. A color monitoring apparatus according to claim 1 wherein said shutter means comprises an opaque disk having a plurality of light passing means spaced about a portion of the circumference of said disk, each of said light passing means being positioned concentrically and angularly displaced about said disk with respect to each other; and means for rotating said disk about a central axis thereof whereby each of said light passing means is sequentially passed beneath said light sensing means.

6. A color monitoring apparatus according to claim 5 and further comprising adjustable crossover means between at least two of said light passing means to limit the light passing through said light passing means during a transitional period in which the trailing edge of one of said light passing means and the leading edge of another of said light passing means are positioned beneath said light sensing means.

7. In a color monitoring apparatus having means for intermittently sensing the light intensity of a product passing through a monitoring station, first and second fixed optical light reference means at said monitoring station exposed for sequential viewing by said light sensing means, said light sensing means detecting the light intensity of said first and second fixed optical light reference means to provide optical reference values; the improvement which comprises:

means to adjust at least one of said optical reference means to alter the optical reference value of said one optical reference means as viewed by said light sensing means; and means for stabilizing and determining the gain of the output of said light intensity sensing means based on the optical values of said first and second optical light reference means.

8. A color monitoring apparatus according to claim 7 wherein said one light reference means comprises a base member fixed with respect to said detecting means; a cover member covering a portion of said base member surface exposed to said light sensing means, said cover member being movable with respect to said base to alter the amount of said base member surface portion exposed to said light sensing means, said base member exposed surface and said cover member being of different optical values such that adjustment of said cover member with respect to said base member alters the optical value of said light reference means as viewed by said light sensing means.

9. An apparatus for sequentially viewing separate adjacent areas within a given plane, said apparatus comprising:

means for sensing light from each of said areas and for generating a signal representative of the average optical value of the light viewed in each of said areas;

an opaque disk interposed between said sensing means and said plane, said disk having a plurality of unobstructed light passing areas permitting passage of light therethrough, each of said light passing areas being positioned in a separate concentric ring on said disk and angularly spaced from other light passing areas about a central axis such that a radius of said disk intersects only one of said light passing means; and means for continuously rotating said disk in front of said sensing means to sequentially expose portions of said plane to said sensing means through said light passing means; and an adjustable crossover means between at least two of said light passing means to limit the light passing through said light passing means during a transitional period in which the trailing edge of one of said light passing means and the leading edge of another light passing means pass beneath said light sensing means.

10. An apparatus according to claim 9 wherein there are three such light passing areas spaced about said disk, each of said light passing areas having an arc of about 120°.

11. An apparatus according to claim 9 and further comprising an aperture plate interposed between said disk and said light sensing means, said aperture plate having aligned openings corresponding to said concentric rings to mask light passing through said light passing areas, and permitting said light to pass only through said aligned openings to said sensing means.

12. A method for continuously monitoring food products on a moving belt for color, said method comprising the steps of:

photoelectrically sensing the light intensity of a viewing area of a fixed light optical reference, said entire viewing area of said light optical reference being sensed substantially simultaneously to thereby average the light intensity of said light optical reference viewing area;

generating a first signal representative of the average value of the light intensity of said light reference viewing area;

photoelectrically sensing the light intensity of a viewing area of said product on said belt, said entire product viewing area being sensed substantially simultaneously to thereby average the light intensity of said product viewing area;

generating a second signal representative of the average value of the light intensity of said product viewing area;

photoelectrically sensing the light intensity of a viewing area of a fixed dark optical reference darker than said light optical reference, said entire viewing area of said dark optical reference being sensed substantially simultaneously to thereby average the light intensity of said dark reference viewing area;

generating a third signal representative of the average value of the light intensity of said dark reference viewing area;

the light intensity of said product viewing area being generally between the light intensity of the viewing areas of the dark and light optical reference; and using said first and third signals to stabilize and determine the gain of said second signal, whereby said second signal is a function of the average light intensity of said product viewing area and the sensitivity of said signal is determined by the difference in light intensities of said light reference viewing area and said dark reference viewing area.

* * * * *